United States Patent [19]

Houst

[11] Patent Number: 4,935,678

[45] Date of Patent: Jun. 19, 1990

[54] UNIVERSAL MOTOR SPEED CONTROL CIRCUIT FOR HAND MIXER

[75] Inventor: Douglas R. Houst, Southside Township, Ala.

[73] Assignee: Whirlpool Corporation, Benton Harbor, Mich.

[21] Appl. No.: 434,704

[22] Filed: Nov. 9, 1989

[51] Int. Cl.⁵ .............................................. H02P 7/38
[52] U.S. Cl. .................................. 318/268; 318/245; 318/252
[58] Field of Search ............... 318/244, 245, 246, 251, 318/252, 268

[56] References Cited

U.S. PATENT DOCUMENTS

| | | | |
|---|---|---|---|
| 3,127,550 | 3/1964 | Gilbreath et al. | 318/331 |
| 3,165,688 | 1/1965 | Gutzwiller | 318/246 |
| 3,177,418 | 4/1965 | Meng | 318/331 |
| 3,329,879 | 7/1967 | Wigington | 318/246 |
| 3,582,738 | 6/1971 | Claassen | 318/249 |
| 3,585,476 | 6/1971 | Rutchik | 318/331 |
| 3,604,996 | 9/1971 | Lutz | 318/345 |
| 3,624,837 | 11/1971 | Albarda | 318/331 |
| 3,783,361 | 1/1974 | Mason | 318/331 |
| 3,924,169 | 12/1975 | Craft et al. | 318/252 X |
| 3,943,421 | 3/1976 | Shibata et al. | 318/484 |
| 4,163,181 | 7/1979 | Farber | 318/245 |
| 4,168,455 | 9/1979 | Soeda et al. | 318/331 |
| 4,170,749 | 10/1979 | Soeda | 318/331 |
| 4,228,383 | 10/1980 | Soeda et al. | 318/245 |
| 4,349,758 | 9/1982 | Grant | 310/68 A |
| 4,390,824 | 6/1983 | Brown | 318/331 |
| 4,481,448 | 11/1984 | Bishop | 318/248 |
| 4,734,629 | 3/1988 | Lessig et al. | 388/819 |

OTHER PUBLICATIONS

G. E. SCR Manual, 1972, p. 290.

*Primary Examiner*—Bentsu Ro
*Attorney, Agent, or Firm*—Jeffers, Hoffman & Niewyk

[57] ABSTRACT

A speed control circuit in combination with an electrical motor for use in a hand-held food mixer operated on AC household electrical current. The motor is a universal type having a series connected armature winding and field winding wherein the field winding includes a plurality of taps each selectably connectable to the current source by a multipoint switch. A Quadrac TM semiconductor switch containing a triac and triggering diac in one package conducts electrical current from the current source through the armature winding and the selected portion of said field winding over a portion of each cycle of the current source. A trigger signal causes switching of the semiconductor switch at a predetermined phase angle relative to the voltage waveform of the current source. An error signal of a magnitude proportional to motor speed and based on counter EMF of the motor is generated by the entirety of the field winding. The error signal is summed with said trigger signal to vary the phase angle of the semiconductor switch to compensate for variations in load applied to the motor.

20 Claims, 1 Drawing Sheet

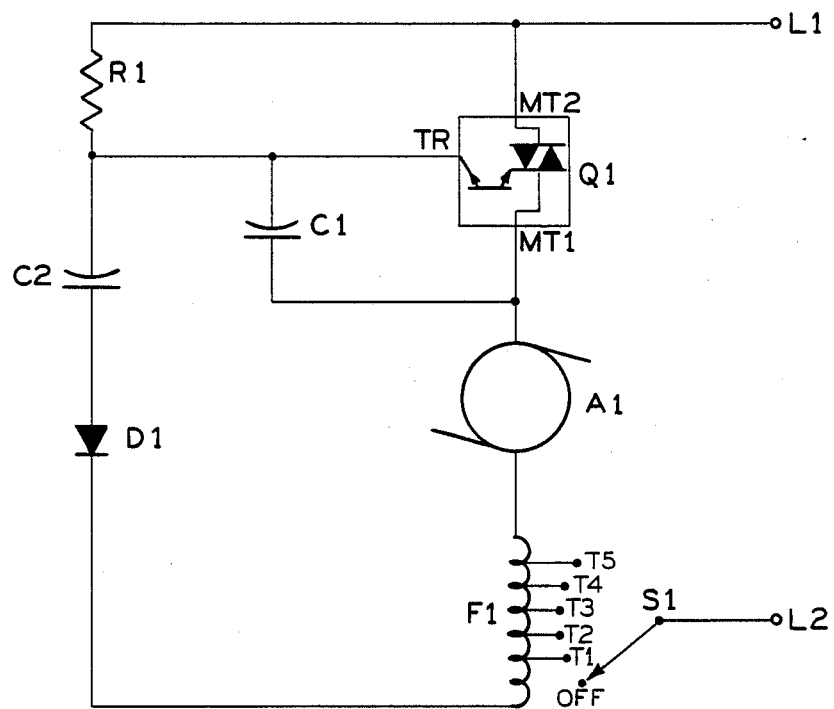

UNIVERSAL MOTOR SPEED CONTROL CIRCUIT FOR HAND MIXER

BACKGROUND OF THE INVENTION

The present invention relates generally to hand held food mixers and more particularly to an electric motor and speed control circuit for such a mixer.

An electric hand-held food mixer typically involves a housing having a handle and containing an electrical motor and gearing linking the motor to counter-rotating receptacles for removable beaters. A line cord for connecting the mixer to the household electrical current supply is provided. Multiple speed selection is usually provided in the form of a thumb operated switch.

One problem with universal motors used in food mixers is that it is a characteristic of such motors to decrease in speed in response to an increase in load, and to speed up in response to a decrease in load. As a result, when the beaters of the mixer are introduced into the food to be mixed, the speed of the mixer often slows to an undesirable level. In an attempt to compensate for this action, the operator will often select a higher speed setting with the speed select switch which causes the mixer to return to an acceptable speed under load. The difficulty arises when the beaters are retracted from the food or the load is otherwise suddenly reduced, such as by adding liquid to the food being mixed. Upon reduction in load, the mixer motor suddenly speeds up, which can result in food being flung at high speed in undesired directions.

The problem underlying the present invention is to provide a simple, economical variable speed motor and speed control therefor for use in a hand-held mixer which provides good speed regulation at any selected speed setting in response to varying load conditions.

Universal type electrical motors have found wide acceptance for use in hand-held food mixers, with a variety of speed control circuits. One common type of speed control circuit involves chopping the 60 Hz AC voltage waveform applied to the motor so that current is delivered to the motor over only a portion of the current cycle. Lower speeds are achieved by chopping out a greater portion of the waveform, such that the average applied voltage is considerably less than the average of the full sinusoidal form.

Chopping of the waveform can be achieved through switching type circuitry. A triac semiconductor device is sometimes used as the heart of such switching circuitry. A triac is a three terminal device with which relatively large amounts of AC current can be switched between two main terminals by a very small trigger current in a third trigger terminal. Triacs revert to a non-conducting state upon reversal of current flow through the main terminals, which makes them especially useful in controlling alternating current circuits. The triac can be turned on with appropriate control circuitry at a selected phase angle in each half cycle.

It would be desireable to provide a speed control circuit for an electrical motor for use in a hand-held mixer which utilizes proven current-chopping speed control with a universal motor, but wherein speed regulation in response to load changes is improved.

SUMMARY OF THE INVENTION

The present invention involves a speed control circuit for a universal type motor in which switching means for switching current to the motor is controlled by circuitry providing a ramp signal for switching the switching means at a selected phase angle, and an error signal proportional to motor speed which is summed with the ramp signal to provide control of the phase angle of switching in accordance with load.

In accordance with one embodiment thereof, the present invention involves a speed control electrical circuit in combination with an electrical motor for use in a hand-held food mixer, the food mixer being connectable to an alternating-polarity electrical current source of fixed frequency and having a cyclical voltage waveform. The motor has an armature winding and a field winding in series connected relationship with one another, and the field winding includes a plurality of taps each selectably connectable to the current source. Means are provided for selectively connecting a selected one of the taps to the current source to selectively energize a portion of the field winding for operating the motor at a selected one of a plurality of motor speeds. The speed control electrical circuit includes switching means, responsive to a trigger signal, for conducting electrical current from the current source through the armature winding and the selected portion of the field winding over a portion of each cycle of the current source. Trigger signal means are connected in circuital relationship to the switching means for producing a trigger signal to cause switching of the switching means at a predetermined phase angle relative to the voltage waveform of the current source. Error signal means are connected in circuital relationship to the trigger signal means for producing an error signal of a magnitude proportional to motor speed, the error signal means being connected in a circuital relationship with the entirety of the field winding, the error signal being summed with the trigger signal to vary the phase angle of the switching means to compensate for variations in load applied to the motor.

It is an object of the present invention to provide an improved motor speed control for an hand-held food mixer having enhanced speed regulation in response to load variations.

Other objects and advantages of the present invention will be apparent from the following description of a preferred embodiment with reference to the drawing.

BRIEF DESCRIPTION OF THE DRAWING

The figure is a schematic diagram of an electronic speed control circuit for a universal electrical motor for a hand held food mixer.

DESCRIPTION OF THE PREFERRED EMBODIMENT

Referring in particular to FIG. 1, there is illustrated a speed control circuit for an electric motor for use in a hand-held kitchen mixer, in accordance with the present invention. Motor M is a series wound universal type electric motor having an armature assembly A1 including an armature winding and commutator, and a field winding F1. The armature winding of armature assembly A1 is connected in series with field winding F1, as is characteristic of universal type motors, such that the current in the armature winding is equal to and in phase with the current in the field winding. Field winding F1 includes a plurality of taps T1–T5. Electrical power is applied to a selected one of the taps T1–T5 through switch S1 to effect step-wise speed control.

In a universal motor, armature speed increases upon weakening of the magnetic field of the field winding. Consequently, in the illustrated embodiment, the speed of motor M increases as taps T1-T5 are selected in order, with tap T5 applying power to the smallest portion of the field winding F1, resulting in the highest speed setting.

Motor M is connected via supply lines L1 and L2 to a source of single-phase fixed-frequency alternating electrical current having a sinusoidal waveform. Ordinarily, the power supply would be normal household electrical service provided at a regulated frequency of 60 Hz and at a nominal voltage of 117 V. Supply line L2 is selectively connected to field F1 of motor M at a selected one of field taps T1-T5 through single-pole multipoint switch S1. Supply line L1 is connected to armature A1 of motor M through semiconductor switch Q1. Thus, semiconductor switch Q1, motor M, and switch S1 are connected in series with one another across supply lines L1 and L2.

Semiconductor switch Q1 is preferably a single-package Quadrac ® internally triggered triac manufactured by Teccor Electronics, Inc., 1801 Hurd Drive, Irving, Tex. 75038. This device is a bi-directional AC switch comprising a triac and a diac trigger connected together inside the same package. Thus, Q1 appears externally as a three-terminal device including main terminals MT1 and MT2 connected in the line to be switched, and a trigger terminal TR. Terminal MT1 of Q1 is connected to armature A1 of motor M, and terminal MT2 of Q1 is connected to line L1.

Capacitor C1 is connected between trigger terminal TR of semiconductor switch Q1 and the junction of armature A1 and terminal MT1. Resistor R1, capacitor C2 and diode D1 are connected in series with one another between line L1 and that end of field winding F1 which is away from armature A1. The junction of capacitor C2 and resistor R1 is connected to trigger terminal TR of semiconductor switch Q1.

When Q1 is in a conducting state, current passes therethrough between terminals MT2 and MT1. Current therefore passes between lines L1 and L2 through motor M, causing the armature A1 to rotate. Were Q1 to conduct at a 100% duty cycle, it would act essentially as a short circuit connection. The average voltage impressed by the supply lines L1 and L2 on motor M would be constant and at the maximum value available from the power source. Thus, the speed of motor M would depend entirely upon the strength of the field as selected by switch S1 and taps T1-T5, and upon the mechanical load on motor M. As is characteristic of universal motors, the speed of motor M tends to decrease in response to an increase in the load.

Because it is desireable to have the speed of the motor remain relatively constant regardless of load, the circuit of FIG. 1 is designed to provide for regulation of the motor speed by altering the average voltage applied to the motor in response to changes in load. This is accomplished by varying the duty cycle of semiconductor switch Q1 such that the duty cycle is about 90% during no-load running conditions for any given tap setting of switch S1, with the duty cycle being increased progressively toward a maximum 100% duty cycle as the load increases to maximum. In this way, the tendency of the motor to slow down in response to increased load is offset by an increase in the average applied voltage, which tends to increase the speed of the motor.

The duty cycle of Q1 is varied by varying the phase angle at which Q1 is triggered, relative to the 60 Hz voltage sine wave impressed by the power source. Q1 is normally non-conducting until a sufficient voltage differential is applied between trigger terminal TR and main terminal MT1 to break over the internal diac trigger, whereupon the input impedance of terminal TR drops and a triggering current is enabled to flow into the trigger terminal TR, thereby turning on the internal triac of Q1 and allowing current to be conducted between main terminals MT2 and MT1. In the preferred Quadrac ® device, the triggering potential difference is approximately 3 volts, regardless of polarity. Once conducting, Q1 thereafter ceases to conduct upon a reversal of current flow therethrough between main terminals MT1 and MT2. Assuming for example that Q1 has been triggered to conduct at a phase angle of 30° relative to the line voltage waveform, then Q1 will continue to conduct until the current flow through Q1 reaches a phase angle of 180°, or in other words, until the current waveform crosses the zero line and reversal of current flow occurs. Q1 will remain non-conducting until a phase angle of 210° (180°+30°) relative to the line voltage is reached at which point Q1 will again be triggered to conduct (with the current in the opposite direction from before) until the current flow through Q1 reaches a phase angle of 360°, at which point the cycle is repeated.

It should be noted that the triggering of Q to conduct is voltage related, whereas the transition to non-conduction is current related. Because of the reactive nature of motor M which is in series with Q1, there is a phase shift between the voltage applied to Q1 and the current therethrough. As a consequence, even though Q1 is non-conducting for a given phase angle range, the precise phase angle relative to the line voltage waveform at which the period of non-conduction begins depends upon the angle of phase shift between the voltage and current. Since the power source voltage is sinusoidal, the average voltage supplied to motor M through Q1 depends not only on the percent duty cycle, but also on the portion of the voltage sine wave which is turned off. Turning off Q1 for a period of 30°, for example, centered on the peak of the sine wave at a phase angle of 90°, would result in a much lower average voltage than if the same 30° period were centered at a phase angle of 15°. As will be explained below, the speed control circuit of the present invention maintains the phase angle (relative to the line voltage waveform) at which non-conduction of Q1 begins relatively constant for a given load independently of the speed selected by switch S1 and taps T1-T5.

The speed regulating action of the circuit of FIG. 1 will now be explained with respect to a point subsequent to start-up in which motor M is rotating and semiconductor switch S1 is non-conducting. For the purpose of the present initial explanation, a hypothetical circuit is assumed which is identical to the circuit of FIG. 1 except that capacitor C2 and diode D1 would be omitted. Current would flow from line L1 through resistor R1 to charge capacitor C1, with armature A1 and a portion of field winding F1 completing the circuit to line L2. The voltage available to charge capacitor C1 would be the supply voltage between lines L1 and L2, less the counter EMF generated in that portion of field winding F1 energized by supply line voltage, i.e., that portion of the field winding F1 between armature A1 and the tap selected by switch S1. The rate at which capacitor C1 would charge would be dependent upon the RC time constant established by the product of the values of R1 and C1, and also upon the charging voltage available. When capacitor C1 has charged to a potential which exceeds the preset potential difference between terminals TR and MT1 at which semiconductor switch Q1 is set to trigger, the triac within Q1 would be triggered to conduct and Q1 would conduct current between main terminals MT2 and MT1, thereby supplying current to motor M. For any given tap setting T1–T5, capacitor C1 would charge to the requisite voltage at a constant phase angle relative to the power source voltage waveform, assuming that motor M was in a steady state condition at a constant speed.

Assuming now that the load on motor M were to be increased, the speed of the motor would tend to decrease. The decrease in motor speed would result in a decrease in the counter EMF generated. Consequently, the line source voltage available to charge capacitor C1 when Q1 is non-conducting would be reduced by a lesser EMF amount, resulting in a greater effective applied voltage and in an increase in speed. Thus, the counter EMF generated by the motor would serve as a feedback variable to regulate the charging of capacitor C1 and hence to regulate the phase angle at which Q1 is triggered to conduct.

It will be appreciated at this point that the amount of counter EMF generated in the portion of the field winding energized by line voltage in the above hypothetical circuit would vary according to the speed tap selected. In other words, when tap T5 is selected through switch S1, only a small portion of the field winding would be included in the circuit branch from L1 through resistor R1, capacitor C1 and armature A1 to L2; whereas when tap T1 is selected nearly all of field winding F1 would be included in the aforementioned circuit branch. As a consequence, the ratio of counter EMF to line voltage would vary greatly from one speed setting to another, resulting in poor matching of speed regulation in response to load between the various speed taps T1–T5.

The solution to the problem of uneven speed regulation between the speed settings is provided by the circuit of FIG. 1 which has a branch including diode D1 and capacitor C2 connected in series with each other between terminal TR of semiconductor switch Q1 and the end of field winding F1 away from armature A1. Thus, that portion of the field winding F1 which is between the tap T1–T5 selected by switch S1 and the end of field winding F1 away from armature A1 is included in the branch.

In the circuit of FIG. 1, the entire counter EMF developed by all of field winding F1 is fed back to trigger terminal TR through capacitor C2. Due to diode D1, counter EMF feedback is applied through capacitor C2 only during alternate half cycles of the supply line voltage waveform. This prevents excessive power dissipation in capacitor C2. Thus, the voltage available to charge capacitor C1 is the supply voltage between lines L1 and L2, minus the entire EMF generated in the entire field winding F1.

By including the entire EMF generated in the entire field winding, the ratio of EMF to applied line supply voltage does not vary as greatly between speed settings T1–T5 as in the hypothetical circuit discussed above, and therefore the speed control characteristics of the circuit in response to a reduction in EMF is more nearly even regardless of speed setting, as discussed further below. It should be noted that a further advantage of utilizing the entire field winding F1 to establish the EMF voltage error signal is the avoidance of variations in the on-off phase angles due to varying phase shift at different speed selections. The phase shift induced by the field winding is constant regardless of which speed tap T1–T5 is selected by switch S1. Yet another advantage of the present invention resides in the fact that the lowest speed setting tap T1 is offset from the end of field winding F1 away from armature A1. Thus, even at the lowest speed setting it is assured that there is sufficient counter EMF generated to provide good speed regulation in response to load.

In the circuit of FIG. 1, the branch of the circuit including resistor R1 and capacitor C1 constitutes a trigger ramp signal generator which generates a trigger ramp voltage signal for triggering Q1 into a conducting state when the ramp voltage across C1, and hence between terminals TR and MT1 of Q1, reaches a predetermined trigger voltage level. The branch of the circuit of FIG. 1 including capacitor C2, diode D1, and field winding F1 constitutes an error signal generator which generates an error voltage signal which is summed with the trigger signal to trigger Q1 into a conducting state. The error signal voltage is proportional to the counter EMF generated by the motor M when Q1 is in a non-conducting state. As the speed of motor M decreases as a result of an increased load, the counter EMF generated decreases also. Thus, the voltage available to charge capacitor C1 increases. In other words, the trigger ramp signal is reduced by a smaller counter EMF summed therewith, resulting in the generation of a ramp signal having a steeper slope. Thus, the ramp signal reaches the predetermined trigger voltage earlier in the cycle of the line supply voltage waveform, thereby triggering Q1 at a smaller phase angle. Q1 therefore, having been turned on earlier, remains in a conducting state for a longer phase angle period, causing the average voltage applied to motor M to increase. The speed of motor M therefore increases to offset the decrease in speed occasioned by the increased load.

The phase angle at which the trigger ramp signal reaches the preset triggering voltage depends upon the rate at which capacitor C1 charges, which is determined by the RC time constant established by the component values assigned to resistor R1 and capacitor C1. These values are selected with consideration of the voltage/current phase shift characteristics of the entire circuit in combination with motor M to achieve a duty cycle of Q1 of about 90% on, 10% off in each half-cycle under no-load conditions, with the off portion of the cycle occurring within the phase angle range of about 30° to about 90°, and about 210° to about 270°.

While the present invention has been particularly described in the context of a preferred embodiment, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which fall within the appended claims or the equivalents thereof.

What is claimed is:

1. In combination with an electrical motor for use in a hand-held food mixer, said food mixer being connectable to an alternating-polarity electrical current source of fixed frequency and having a cyclical voltage waveform, said motor having an armature winding and a field winding in series connected relationship with one another, said field winding including a plurality of taps each selectably connectable to said current source, means for selectively connecting a selected one of said taps to said current source to selectively energize a portion of said field winding for operating said motor at a selected one of a plurality of motor speeds, the improvement comprising a speed control electrical circuit including:

switching means, responsive to a trigger signal, for conducting electrical current from said current source through said armature winding and said selected portion of said field winding over a portion of each cycle of said current source;

trigger signal means connected in circuit relationship to said switching means for producing a trigger signal to cause switching of said switching means at a predetermined phase angle relative to the voltage waveform of said current source; and error signal means connected in circuit relationship to said trigger signal means for producing an error signal of a magnitude proportional to motor speed, said error signal means being connected in a circuit relationship with the entirety of said field winding, said error signal being summed with said trigger signal to vary the phase angle of said switching means to compensate for variations in load applied to said motor.

2. The food mixer motor speed control as claimed in claim 1, in which said switching means includes a semiconductor device including a trigger terminal connected to said trigger signal means and said error signal means, and first and second main terminals connected in a series connected circuit branch with said armature winding and said selected portion of said field winding, with said series connected circuit branch being connected across said electrical current source.

3. The food mixer motor speed control as claimed in claim 2, in which said semiconductor device includes a triac.

4. The food mixer motor speed control as claimed in claim 3, in which said semiconductor device further includes a diac trigger packaged together with said triac.

5. The food mixer motor speed control as claimed in claim 2, in which said trigger signal means includes a capacitor connected in circuital relationship with said motor and said switching means.

6. The food mixer motor speed control as claimed in claim 5, in which said error signal means includes a series connected circuit branch including a resistor, a capacitor and a diode.

7. The food mixer motor speed control as claimed in claim 2, in which said error signal means includes a series connected circuit branch including a capacitor and a diode.

8. The food mixer motor speed control as claimed in claim 1, in which said error signal means includes a capacitor connected in circuit relationship with said motor and said switching means.

9. The food mixer motor speed control as claimed in claim 8, in which said error signal means includes a series connected circuit branch including a capacitor and a diode.

10. The food mixer motor speed control as claimed in claim 8, in which said semiconductor device includes a triac.

11. The food mixer motor speed control as claimed in claim 10, in which said semiconductor device further includes a diac trigger packaged together with said triac.

12. The food mixer motor speed control as claimed in claim 1, in which said error signal means includes a series connected circuit branch including a capacitor and a diode.

13. A speed control electrical circuit for use with an electrical motor in a hand-held food mixer, said motor being connectable to an alternating-polarity electrical current source of fixed frequency and having a cyclical voltage waveform, said motor having an armature winding and a field winding in series connected relationship with one another, said field winding including a plurality of taps each selectably connectable to said current source, means for selectively connecting a selected one of said taps to said current source to selectively energize a portion of said field winding for operating said motor at a selected one of a plurality of motor speeds, said speed control electrical circuit comprising:

switching means, responsive to a trigger signal, for conducting electrical current from said current source through said armature winding and said selected portion of said field winding over a portion of each cycle of said current source;

trigger signal means connected in circuit relationship to said switching means for producing a trigger signal to cause switching of said switching means at a predetermined phase angle relative to the voltage waveform of said current source; and error signal means connected in circuit relationship to said trigger signal means for producing an error signal of a magnitude proportional to motor speed, said error signal means being connected in a circuit relationship with the entirety of said field winding, said error signal being summed with said trigger signal to vary the phase angle of said switching means to compensate for variations in load applied to said motor.

14. The motor speed control electrical circuit as claimed in claim 13, in which said switching means includes a semiconductor device including a trigger terminal connected to said trigger signal means and said error signal means, and first and second main terminals connected in a series connected circuit branch with said armature winding and said selected portion of said field winding, with said series connected circuit branch being connected across said electrical current source.

15. The motor speed control electrical circuit as claimed in claim 14, in which said semiconductor device includes a triac and a diac trigger packaged together with said triac.

16. The motor speed control electrical circuit as claimed in claim 13, in which said trigger signal means includes a capacitor connected in circuit relationship with said motor and said switching means.

17. The motor speed control electrical circuit as claimed in claim 13, in which said error signal means includes a series connected circuit branch including a capacitor and a diode.

18. In combination with a universal electrical motor for use in a hand-held food mixer, said food mixer being connectable to an AC electrical current source, said motor having an armature winding and a field winding in series connected relationship with one another, said field winding including a plurality of taps each selectably connectable to said current source, a multipoint switch connecting said current source to a selected one of said taps to selectively energize a portion of said field winding for operating said motor at a selected one of a plurality of motor speeds, the improvement comprising a speed control electrical circuit including:

- a semiconductor switch including a trigger terminal, and first and second main terminals connected in a series connected circuit branch with said armature winding and said selected portion of said field winding, with said series connected branch being connected across said electrical current source;
- a trigger ramp circuit branch including a resistor connected between said second main terminal and said trigger terminal, and a capacitor connected between said trigger terminal and said first main terminal, said first main terminal being connected to said armature winding and said second main terminal being connected to one leg of said current source; and
- an error signal circuit branch including a capacitor, a diode, and the field winding of said motor connected together in series circuit relationship, the capacitor being connected at one end to said trigger terminal and at the other end to said diode, said diode further being connected to said field winding.

19. The speed control electrical circuit as claimed in claim 18, in which said semiconductor device includes a triac.

20. The speed control electrical circuit as claimed in claim 19, in which said semiconductor device further includes a diac trigger packaged together with said triac.

* * * * *